United States Patent [19]
Takagi et al.

[11] Patent Number: 5,466,499
[45] Date of Patent: Nov. 14, 1995

[54] HEAT-SHRINKABLE POLYSTYRENE TUBE

[75] Inventors: Jun Takagi; Hirotsugu Fujita, both of Nagahama, Japan

[73] Assignee: Mitsubishi Plastics Industries Limited, Tokyo, Japan

[21] Appl. No.: 222,834

[22] Filed: Apr. 5, 1994

[30] Foreign Application Priority Data

Jun. 11, 1993 [JP] Japan .................................. 5-140288

[51] Int. Cl.$^6$ .................................. B29D 23/00
[52] U.S. Cl. .................. 428/36.9; 428/34.9; 428/35.2; 525/98
[58] Field of Search .................... 525/88, 71, 314, 525/98; 428/34.9, 36.9, 35.7, 35.2

[56] References Cited

U.S. PATENT DOCUMENTS

| | | | |
|---|---|---|---|
| 4,386,125 | 5/1983 | Shiraki et al. | 525/314 |
| 5,189,110 | 2/1993 | Ikematu et al. | 525/314 |

FOREIGN PATENT DOCUMENTS

| | | |
|---|---|---|
| 0058952 | 9/1982 | European Pat. Off. . |
| 0251047 | 1/1988 | European Pat. Off. . |
| 0454173 | 10/1991 | European Pat. Off. . |

OTHER PUBLICATIONS

Patent Abstracts of Japan, vol. 14, No. 152 (M–0953), Mar. 23, 1990, JP–A–02 014 125, Jan. 18, 1990.

*Primary Examiner*—Paul R. Michl
*Assistant Examiner*—Mark L. Warzel
*Attorney, Agent, or Firm*—Oblon, Spivak, McClelland, Maier & Neustadt

[57] ABSTRACT

A heat-shrinkable polystyrene tube made of a composition comprising, as main components, a block copolymer having styrene-type hydrocarbon blocks and conjugated diene-type hydrocarbon blocks, and a polymer containing a styrene-type hydrocarbon, wherein the conjugated diene-type blocks in the block copolymer constitute from 5 to 40 wt % of the entire composition.

11 Claims, No Drawings

HEAT-SHRINKABLE POLYSTYRENE TUBE

The present invention relates to a heat-shrinkable polystyrene tube excellent in covering processability, which is useful mainly for covering dry cells.

As a heat-shrinkable tube for dry cells, the one made of polyvinyl chloride is well known. However, polyvinyl chloride has an environmental problem such that when incinerated, it produces hydrogen chloride. Accordingly, in recent years, a heat-shrinkable tube made of a material containing no halogen element, has been desired.

As a candidate for such a material, a styrene-butadiene type block copolymer may be mentioned, since it is practically used in the field of shrinkable films. In general, a styrene-type polymer has strong nerviness, but it is poor in the impact resistance and has drawbacks that when bent, it is likely to undergo cracking or whitening. Therefore, it is not practically useful for a seamless tube. Whereas, by increasing the butadiene content of such a styrene-butadiene type block copolymer, it is possible to obtain a tube having high impact resistance.

However, with a tube made of such a styrene-butadiene type block copolymer, if it is attempted to improve the impact resistance or to overcome whitening on bending, the nerviness tends to be poor, whereby it will be difficult to cover it on dry cells by a high speed automatic covering apparatus.

Further, it is usually necessary to set the stretching temperature at a high level to produce a tube from a styrene-butadiene type block copolymer. Accordingly, the temperature for shrinkage tends to be high, such being undesirable to use the tube for covering dry cells.

As a technique to provide a tube shrinkable at a low temperature by overcoming such a problem, a method has been developed wherein a styrene-butadiene type block copolymer having a molecular weight within a certain specific range or a certain specific molecular weight distribution, or a styrene-butadiene type block copolymer having a special block structure, is used.

However, the tube shrinkable at a low temperature produced by such a method undergoes so-called natural shrinkage i.e. shrinkage during the storage at room temperature after stretching of the tube. Accordingly, the low temperature shrinkable tube is poor in flatness or dimensional stability, and its performance has not been satisfactory.

Further, a tube is usually wound up in a flattened state, and when it is to bemused, it is cut into a predetermined length, whereupon it will be opened, so that it will be put on e.g. a dry cell in the opened state. However, the tube made of such a styrene-butadiene type block copolymer is poor in the opening property, whereby it has been difficult to put it on a dry cell by a high speed automatic covering apparatus. Further, the inner surface of the tube is poor in the slip properties. Also from this viewpoint, it has been difficult to put it on a dry cell by a high speed automatic covering apparatus.

Furthermore, it has been a problem that at the time of tubular stretching to produce a heat-shrinkable tube, the folded portions nipped by rollers undergo whitening, and such folded portions are likely to rupture, thus leading to puncture.

Still further, the tube made of a styrene-butadiene type block copolymer has a large shrinkage in the longitudinal direction. Accordingly, when e.g. a cylindrical dry cell is to be covered by heat shrinking of a tube, shrinking occurs not only in the radial direction but also substantially in the longitudinal direction, whereby there have been problems such that positioning of the tube is difficult and the covering finish is poor.

It is an object of the present invention to overcome the above problems and to provide a tube which is excellent in the impact resistance and free from whitening on bending and which has nerviness and is capable of being readily put on dry cells by a high speed automatic covering apparatus.

Namely, the present invention provides a heat-shrinkable polystyrene tube made of a composition comprising, as main components, a block copolymer having styrene-type hydrocarbon blocks and conjugated diene-type hydrocarbon blocks, and a polymer containing a styrene-type hydrocarbon, wherein the conjugated diene-type blocks in the block copolymer constitute from 5 to 40 wt % of the entire composition.

In a preferred embodiment, the present invention is intended to provide a heat-shrinkable polystyrene tube which has both excellent low temperature shrinkability and little natural shrinkability and which preferably has an excellent inner surface slip property and opening property. Further, it is intended to provide a heat-shrinkable polystyrene tube which is free from puncture due to rupture of the folded portions at the time of stretching. Such preferred embodiments of the present invention will be described in detail.

In the block copolymer having styrene-type hydrocarbon blocks and conjugated diene-type hydrocarbon blocks of the present invention, the styrene-type hydrocarbon blocks may, for example, be a homopolymer of e.g. styrene, o-methylstyrene, p-methylstyrene or α-methylstyrene, a copolymer thereof and/or a copolymer containing in the blocks a copolymerizable monomer other than styrene-type hydrocarbons.

Likewise, the conjugated diene-type hydrocarbon blocks of the block copolymer may, for example, be a homopolymer of e.g. butadiene, isoprene or 1,3-pentadiene, a copolymer thereof and/or a copolymer containing in the blocks a copolymerizable monomer other than conjugated diene-type hydrocarbons.

The structure of the block copolymer and the structure of each block segment are not particularly limited. The structure of the block copolymer may, for example, be linear or star-like. The structure of each block segment may, for example, be a complete block or a tapered block. The weight ratio of the styrene-type hydrocarbon blocks to the conjugated diene-type hydrocarbon blocks is usually preferably within a range of from 20:80 to 90:10, more preferably from 20:80 to 40:60.

In the present invention, the styrene-type polymer to be mixed to the above block copolymer may be a usual polystyrene, but is preferably a random copolymer containing a styrene-type hydrocarbon and having a glass transition temperature of from 40° to 90° C. or/and a high-impact polystyrene having conjugated diene-type hydrocarbon polymer particles dispersed therein. When the random copolymer having a glass transition temperature of from 40° to 90° C. is employed, the nerviness of the tube will be improved, and it is thereby possible to obtain a tube which is shrinkable at a low temperature and which undergoes little natural shrinkage. In the present invention, the peak corresponding to the main dispersion of loss elastic modulus is taken as the glass transition temperature. The loss elastic modulus was measured at a vibration frequency of 10 Hz by means of a dynamic viscoelasticity measuring apparatus.

When the high-impact polystyrene having conjugated diene-type hydrocarbon polymer particles dispersed therein is employed, it is possible to prevent longitudinal rupture of the folded portions of the tube and to make constant stretching possible, and the slip-properties of the tube will be improved.

When the styrene-type random copolymer and the high-impact polystyrene are used in combination, it is possible to obtain a tube which is shrinkable at a low temperature and which undergoes little natural shrinkage, it is possible to prevent longitudinal rupture of the folded portions of the tube and to make constant stretching possible, and the slip-property of the tube will be improved.

When a styrene-type polymer is mixed to the block copolymer of the styrene-type hydrocarbon and the conjugated diene-type hydrocarbon, the proportion of the styrene-type polymer to be incorporated is determined roughly by the weight ratio of the conjugated diene-type hydrocarbon blocks in the final blend composition. However, such a proportion may often vary depending upon the type of the styrene-type resin, and a proper blending ratio is appropriately determined and is usually within a range of from 5 to 40 wt %.

Namely, if the weight ratio of the conjugated diene type hydrocarbon blocks in the blend composition is less than 5 wt %, the impact resistance of the resulting tube tends to be poor, such being undesirable. On the other hand, if it exceeds 40 wt %, the tensile modulus of elasticity in the longitudinal direction of the tube tends to be smaller than 150 kgf/mm$^2$, such being unsuitable for processing by a high speed automatic covering apparatus.

To adjust the glass transition temperature of the random copolymer within a range of from 40° to 90° C. it is common to employ a monomer different from the styrene-type hydrocarbon. As such a monomer, it is preferred to employ a monomer, of which the glass transition temperature of the homopolymer would be at most 70° C., more preferably at most 55° C. Specifically, an acrylic acid ester, a conjugated diene-type hydrocarbon, a vinyl ether, a fatty acid vinyl and a 1-alkene may be mentioned. These monomers may be employed alone or in combination as a mixture of two or more of them.

The acrylic acid ester may, for example, be ethyl (meth)acrylate, propyl (meth)acrylate, butyl (meth)acrylate, pentyl (meth)acrylate, hexyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate, 2-hydroxyethyl (meth)acrylate, 2-hydroxypropyl (meth)acrylate or tetrahydrofurfuryl (meth)acrylate.

The conjugated diene-type hydrocarbon may, for example, be butadiene, isoprene or 1,3-pentadiene.

The vinyl ether may be a vinyl alkyl ether having a $C_1$–$C_8$ alkyl group such as vinyl methyl ether, vinyl ethyl ether, vinyl propyl ether, vinyl butyl ether, vinyl hexyl ether, vinyl octyl ether or vinyl-2-ethylhexyl ether.

The fatty acid vinyl may, for example, be vinyl acetate, vinyl propionate, vinyl buryrate, vinyl pivalate, vinyl caproate, vinyl caprylate, vinyl caprate, vinyl laurate, vinyl myristate, vinyl palmitate, vinyl stearate, vinyl 2-ethyl-2-methylbutanoate, vinyl 2,2-dimethylbutanoate or vinyl 2,2-dimethylpentanoate.

The 1-alkene may, for example, be ethylene, propylene, butene, pentene, hexene, heptene or octene.

In the present invention, the glass transition temperature of the random copolymer is preferably adjusted within a range of from 40° to 90° C. If it is lower than this range, the natural shrinkage tends to be large, when it is mixed with the block copolymer. On the other hand, if it is higher than the range, no adequate low temperature shrinkage tends to be obtained.

The copolymerization ratio of the styrene-type hydrocarbon to other monomer is preferably from 50/50 to 95/5 wt %. If the styrene-type hydrocarbon is less than 50 wt %, when it is mixed with the block copolymer, substantial turbidity is likely to result, such being undesirable from the viewpoint of the appearance of the product. On the other hand, if it exceeds 95 wt %, it tends to be difficult to adjust the glass transition temperature to the range of from 40° to 90° C.

For the purpose of e.g. solving the above-mentioned turbidity problem, a further monomer other than the above-described monomers may be copolymerized to the random copolymer within a range not to exceed 20 wt %.

In the present invention, a random copolymer of styrene with an acrylic acid ester, particularly n-butyl acrylate, can be preferably used for a reason of e.g. low cost. To adjust the glass transition temperature of the random copolymer to a range of from 40°0 to 90° C., the copolymerization ratio of the styrene to n-butyl acrylate may be controlled within a range of from 75/25 to 95/5 by weight ratio.

Any conventional method such as suspension polymerization, emulsion polymerization, bulk polymerization, solution polymerization or gas phase polymerization may be employed as a method for producing the random copolymer. Also with respect to the type of reaction, any one of radical polymerization, anionic polymerization and cationic polymerization may be employed.

The molecular weight (Mw) of the random polymer is preferably from 50,000 to 500,000, more preferably from 100,000 to 300,000, from the viewpoint of the balance of the melting properties and the mechanical properties.

The high-impact polystyrene (hereinafter referred to as HIPS) to be used in the present invention is effective to prevent the longitudinal rupture along the fold lines of the tube and to make stabilized stretching possible, and it is also effective to improve the slip-property of the tube. Any commercial product may be employed. However, the one satisfying the following two conditions is preferred.

1) The content of conjugated diene-type hydrocarbon particles (rubber component) is at least 5 wt %.
2) The melt index (ASTM D1238; condition G) is at most 20.

If the content of the rubber component is less than 5 wt %, the effects intended by the present invention tend to be hardly obtainable, and if the melt index exceeds 20, no adequate elongation tends to be obtained as a tube for covering dry cells.

The amount of HIPS to be incorporated is preferably within a range of from 1 to 95 wt %, more preferably from 5 to 90 wt %, based on the total amount of the mixture of this HIPS with the above block copolymer or with a mixed polymer of the above block copolymer and the above styrene-type polymer.

If the amount of HIPS is less than 1 wt %, no adequate effects for improving tear propagation strength by the conjugated diene-type hydrocarbon particles of HIPS tend to be obtainable, whereby it will be difficult to prevent the longitudinal rupture along the fold lines of the tube. Further, the conjugated diene-type hydrocarbon particles of HIPS will not appear on the tube surface, whereby no adequate surface roughness required for readily inserting dry cells by an automatic covering apparatus can be realized, and the slip-property will be poor and a trouble in insertion will be more likely to occur.

If the amount of HIPS exceeds 95 wt %, the weight ratio of the conjugated diene-type hydrocarbon blocks in the final blend composition will be less than 5 wt %, whereby the impact resistance of the tube will be low, such being undesirable.

The tube of the present invention is required to have an inner surface dynamic friction coefficient of at most 0.4, preferably at most 0.3, so that it is useful as a shrinkable tube for covering a zinc can of a dry cell. If the inner surface dynamic friction coefficient is larger than 0.4, a trouble in inserting dry cells will be likely to result in covering dry cells by an automatic covering machine.

As a method of bringing the dynamic friction coefficient to a level of at most 0.4, addition of a lubricant to the above composition is preferred in a case where incorporation of HIPS is not adequate. As an organic lubricant, a hydrocarbon type such as paraffin, microwax or low molecular weight polyethylene; a fatty acid type such as a higher fatty acid or an oxy fatty acid; a fatty amide type such as a monofatty amide or an alkylene bisfatty amide; an ester type such as a fatty acid-lower alcohol ester, a fatty acid-polyhydric alcohol ester or a fatty acid-polyhydric alcohol ester; an alcohol type such as an fatty alcohol, a polybasic alcohol, a polyglycol or a polyglycerol; or a metal soap type, may be mentioned.

Particularly preferred as the block copolymer for the composition for the tube of the present invention, is the one wherein the weight ratio of the styrene-type hydrocarbon blocks to the conjugated diene-type hydrocarbon blocks is within a range of from 20:80 to 40:60, as mentioned above. When such a block copolymer having a high weight ratio of the conjugated diene-type hydrocarbon blocks is used, the bleed property of the lubricant will be good in a case where the lubricant is incorporated, the opening property of the tube will be substantially improved, and such is advantageous also from the viewpoint of costs.

Further, an inorganic lubricant being inert fine particles of e.g. kaolin, clay, calcium carbonate, silicon oxide, calcium terephthalate, aluminum oxide, titanium oxide, calcium phosphate or lithium fluoride, may be incorporated. The amount of such an inorganic lubricant is optionally determined depending upon the degree of reduction of the dynamic friction coefficient.

The composition comprising the respective components as described above, can be mixed by a usual kneader. However, with a view to easy operation, it is preferred to employ an extruder, particularly a twin screw extruder. Further, the composition may directly be extrusion-molded as a dry blend.

The mixed composition is extruded into a tubular shape through a ring die by an extruder. The resulting non-stretched tube is then subjected to tubular stretching in the longitudinal and radial directions. Here, the stretching ratio is from 1 to 1.7 times, preferably from 1 to 1.4 times, in the longitudinal direction and from 1.7 to 4 times, preferably from 1.8 to 3.5 times, in the radial direction. So long as the thickness will not be uneven, the stretching temperature is preferably low and is usually preferably selected within a range of from 72° to 98° C.

The stretching method may be usual tubular stretching, and the stretched tube may be wound up to obtain a product.

The thickness of the tube thus obtained is not particularly limited. However, as a shrinkable tube for dry cells, the thickness is usually from 30 to 150 μm, preferably from 50 to 100 μm.

To be used as a shrinkable tube for dry cells, the tube of the present invention is required to have a shrinkage of at most 40%, preferably at most 30%, in the longitudinal direction and at least 40%, preferably at least 45%, in the radial direction, when held in hot water of 100° C. for 10 seconds. If the shrinkage in at least the radial direction is not at least 40%, when such a tube is used for covering a dry cell, the end portions of the tube will not fit on the dry cell and will be left in a lifted state, such being undesirable.

Further, even if the shrinkage in the radial direction is at least 40%, if the shrinkage in the longitudinal direction exceeds 40%, when such a tube is covered by an automatic covering machine for dry cells, it may happen that the covering position is displaced, or it is necessary to increase the cut length, thus leading to an increase of costs, such being undesirable.

The shrinkage is controlled depending upon the characteristics (mainly the glass transition temperature) of the composition by adjusting the stretching ratio and the stretching temperature.

Various additives which are commonly used, such as an ultraviolet absorber, an antioxidant, a stabilizer, a coloring agent, a plasticizer and a filler, may be incorporated into the above-described resin composition as the starting material for the tube, depending upon the particular purpose.

Now, the present invention will be described in further detail with reference to Examples. However, it should be understood that the present invention is by no means restricted to such specific Examples. Various properties were measured and evaluated as follows:

(1) Glass Transition Temperature (° C.)

It was measured at a vibration frequency of 10 Hz by means of a viscoelasticity spectrometer VES-F3, manufactured by Iwamoto Seisakusho K.K., and the peak temperature for the main dispersion of loss elastic modulus was taken as the glass transition temperature.

(2) Shrinkage (%) at 100° C.

A tube was immersed in hot water of 100° C. for 10 seconds, whereupon the shrinkage was calculated in both the longitudinal and radial directions.

$$\text{Shrinkage } (\%) = [(L_0 - L_1)/L_0] \times 100$$

where $L_0$: length before shrinking $L_1$: length after shrinking (3) Natural shrinkage (%)

A tube was left to stand for 30 days in an oven of 30° C., and then the natural shrinkage was obtained in the radial direction.

(4) Dynamic Friction Coefficient

In accordance with JIS K-7125, the lower test piece was 25 mm×125 mm, the upper test piece was 15 mm×120 mm, and the slip piece was 50 g with a pressing area of 15 mm×40 mm, and the dynamic frictional coefficient was measured by pulling the upper test piece.

(5) Finishing

Using an automatic covering machine for dry cells (SW-1) manufactured by Nippon Jido Seiki K.K., a tube with a flattened diameter of 23 mm and a cut length of 53 mm was put on a TANSAN dry cell and then heat-shrunk, whereupon finishing was evaluated by such evaluation standards that symbol x indicates that the end portions of the tube did not fit on the cell and curled up, or the covering position was displaced, symbol Δ indicates that such defects were slight, and symbol O indicates that no such defects were observed.

(6) Opening Property

Using an automatic covering machine for dry cells (SW-1) manufactured by Nippon Jido Seiki K.K., the opening property was evaluated under such evaluation standards that symbol O indicates that the opening property was good without any trouble, symbol Δ indicates that out of 10 tubes, from 1 to 5 tubes showed defective opening, and symbol x indicates that out of 10 tubes, 6 or more tubes showed defective opening.

(7) Tensile Modulus of Elasticity (kgf/cm$^2$)

A test piece having a cut length of 360 mm and a width of 5 mm, was set by chucks with a distance between reference lines being 300 mm, followed by a tensile test at a pulling speed of 100 mm/min, and the tensile modulus of elasticity was calculated from the load-elongation curve.

(8) Drop Impact Rupture

A tube having a flattened diameter of 23 mm and a cut length of 53 mm was put on a TANSAN dry cell, and then the coated dry cell was dropped from a height of 500 mm onto a concrete surface, so that the edge portion of the dry cell will hit the concrete surface first, whereupon evaluation was made under such evaluation conditions that symbol O indicates that no rupture of the tube took place, symbol Δ indicates that out of 10 tubes, from 1 to 5 tubes showed rupture, and symbol x indicates that out of 10 tubes, at least 6 tubes showed rupture.

(9) Running Property by an Automatic Covering Machine

By using an automatic covering machine (SW-1) for dry cells manufactured by Nippon Jido Seiki K.K., the running property by an automatic covering machine was evaluated under such evaluation standards that symbol O indicates that there was no running trouble such that the tube was caught during the running, symbol Δ indicates that out of 10 tubes, from 1 to 5 tubes had a running trouble, and symbol x indicates that out of 10 tubes, at least 6 tubes had a running trouble.

(10) Surface Roughness

In accordance with JIS B0601, the surface condition was measured by means of a roughness analyzing apparatus AY-22, manufactured by Kabushiki Kaisha Kosaka Kenkyusho, and a ten point average roughness was obtained.

(11) Continuous Productivity

Symbol x indicates that when a composition extruded from a ring die by an extruder, was subjected to tubular stretching, no satisfactory product was obtained due to frequent troubles such as longitudinal tearing puncture, symbol Δ indicates that satisfactory products were obtained, but puncture troubles occurred occasionally, and symbol O indicates that satisfactory products were constantly obtained substantially without puncture troubles.

EXAMPLE 1

Preparation of a Random Copolymer

Into an autoclave equipped with a temperature controlling apparatus and a stirring apparatus, 0.5 part by weight of azobisisobutyronitrile as an initiator, a total of 100 parts by weight of styrene and n-butyl acrylate, and 300 parts by weight of cyclohexane were charged, and the mixture was heated at 100° C. for 3.5 hours under 3 atm with thorough stirring. Then, the obtained white copolymer was washed with methanol and dried under reduced pressure. In this manner, four types of styrene-n-butyl acrylate random copolymers (RP-1 to 4) as identified in Table 1 were prepared. The molecular weights (Mw) were measured by a conventional GPC method and calculated as polystyrene.

The chemical compositions and random structures of the random copolymers were confirmed by IR, NMR, dynamic viscoelasticity measurements, whereby it was confirmed that the desired products were synthesized.

Preparation of a Composition

A block copolymer comprising 70 wt % of styrene and 30 wt % of butadiene (manufactured by Asahi Chemical Industry Co., Ltd.) and one of random copolymers RP-1 to 4 as shown in Table 1, were dry-blended at a ratio of 45/55 (wt %) and melt-mixed by means of a same directional twin screw extruder to obtain pellets of the composition.

Preparation of a Tube and Performance Test

The above composition was subjected to tubular extrusion to obtain a non-stretched tube having an outer diameter of 8.0 mm and a thickness of 0.20 mm.

Such a tube was subjected to tubular stretching at the lowest temperature at which stretching was possible in a stretch ratio of 1.2 times in the longitudinal direction and 2.5 times in the radial direction, to obtain a stretched tube. In Table 2, the shrinkage at 100° C. and the natural shrinkage are shown.

Using, as the block copolymer, a block copolymer made of 30 wt % of styrene and 70 wt % of butadiene (manufactured by Asahi Chemical Industry Co., Ltd.), a similar evaluation was carried out, and the results are shown in Table 3.

TABLE 1

|  | RP-1 | RP-2 | RP-3 | RP-4 |
| --- | --- | --- | --- | --- |
| Amount of styrene (wt %) | 60 | 75 | 90 | 98 |
| Amount of n-butyl acrylate (wt %) | 40 | 25 | 10 | 2 |
| Molecular weight (Mw) | 150,000 | 153,000 | 158,000 | 157,000 |
| Glass transition temp. (°C.) | 20 | 45 | 75 | 95 |

TABLE 2

| | No. | | | | |
| --- | --- | --- | --- | --- | --- |
| | 1 | 2 | 3 | 4 | 5 |
| Random copolymer | RP-1 | RP-2 | RP-3 | RP-4 | None |
| Stretchable lowest temp. | 55 | 75 | 95 | 105 | 110 |
| Shrinkage in the longitudinal direction | 16 | 16 | 14 | 5 | 2 |
| Shrinkage in the radial direction | 71 | 71 | 58 | 15 | 10 |
| Natural shrinkage | 2.5 | 1.0 | <1 | <1 | <1 |

TABLE 3

| | No. | | | |
| --- | --- | --- | --- | --- |
| | 6 | 7 | 8 | 9 |
| Random copolymer | RP-1 | RP-2 | RP-3 | RP-4 |
| Stretchable lowest temp. | 55 | 75 | 95 | 105 |
| Shrinkage in the longitudinal direction | 17 | 17 | 15 | 5 |
| Shrinkage in the radial direction | 61 | 55 | 53 | 15 |
| Natural shrinkage | 2.5 | 1.0 | <1 | <1 |

As is evident from the results shown in Tables 2 and 3, in Test Nos. 2, 3, 7 and 8, the shrinkage at 100° C. in the radial direction is more than 40%, and the natural shrinkage is smaller than 2.0%, which fall within the practical ranges. On the other hand, in Test Nos. 1 and 6, the natural shrinkage is larger than 2.0%, whereby a problem such as waviness or inadequate diameter of the tube due to the natural shrinking, is likely to result. In Test Nos. 4, 5 and 9, the natural shrinkage is small, but the shrinkage in the radial direction is small at a level of 20%, and the low temperature shrinkability is poor, and they are inferior to Test Nos. 2, 3, 7 and 8.

EXAMPLE 2

85 wt % of styrene and 15 wt % of n-butyl acrylate were polymerized in the same manner as in Example 1 to obtain random copolymer RP-5. The molecular weight (Mw) of RP-5 was 110,000, and the glass transition temperature was 53° C.

The above random copolymer RP-5 and one of the following two types of block copolymers i.e. ($B_1$) a block copolymer made of 70 wt % of styrene and 30 wt % of butadiene (manufactured by Asahi Chemical Industry Co., Ltd.) or ($B_2$) a block copolymer made of 30 wt % of styrene and 70 wt % of butadiene (manufactured by Asahi Chemical Industry Co., Ltd.) were mixed with 1.0 part of an organic lubricant ethylene bisstearyl amide in the weight proportions as identified in Table 4 in the same manner as in Example 1 to obtain a composition. This composition was subjected to tubular extrusion to obtain a non-stretched tube having an outer diameter of 8.0 mm and a thickness of 0.20 mm. This tube was subjected to tubular stretching at a stretching temperature of 95° C. at a stretch ratio of 1.2 times in the longitudinal direction and 2.5 times in a radial direction to obtain a stretched tube, whereupon various properties were evaluated. In the same manner, tests were carried out with the weight proportions as identified in Table 4, and the results were compared.

inferior in the running property by an automatic covering machine.

Further, the stretched tubes (Nos. 13, 15 and 16) made of compositions using a block copolymer ($B_2$) wherein butadiene blocks constitute 70 wt %, are excellent in the bleeding property of the lubricant, and they have low dynamic friction coefficients as compared with the stretched tubes (Nos. 12 and 14) made of compositions wherein butadiene blocks constitute 30 wt %, and their opening properties were better.

EXAMPLE 3

20 Parts by weight of a block copolymer made of 30 wt % of styrene and 70 wt % of butadiene (manufactured by Asahi Chemical Industry Co., Ltd.), 75 parts by weight of the above-mentioned random copolymer RP-5 and 5 parts by weight of common polystyrene (manufactured by Asahi Chemical Industry Co., Ltd.) were mixed together with ethylene bisstearyl amide as an organic lubricant in an amount as identified in Table 5, and a non-stretched tube was prepared in the same manner as in Example 1. Then, such a tube was subjected to tubular stretching at a stretching temperature of 95° C. under the stretch ratio as identified in Table 5, to obtain a stretched tube. Various properties of such a tube were evaluated, and the results are shown in Table 5.

TABLE 4

| | No. | | | | | | |
|---|---|---|---|---|---|---|---|
| | 11 | 12 | 13 | 14 | 15 | 16 | 17 |
| Random copolymer (parts by weight) | 95 | 73 | 89 | 17 | 64 | 43 | 36 |
| Block copolymer | $B_2$ | $B_1$ | $B_2$ | $B_1$ | $B_2$ | $B_2$ | $B_2$ |
| (parts by weight) | 5 | 27 | 11 | 83 | 36 | 57 | 64 |
| Weight ratio of conjugated diene blocks (%) | 3 | 8 | 8 | 25 | 25 | 40 | 45 |
| Tensile modulus of elasticity | 298 | 281 | 277 | 220 | 216 | 165 | 138 |
| Running property by an automatic machine | ◯ | ◯ | ◯ | ◯ | ◯ | ◯~△ | X |
| Drop impact rupture | X | ◯ | ◯ | ◯ | ◯ | ◯ | ◯ |
| Dynamic friction coefficient | 0.35 | 0.38 | 0.31 | 0.36 | 0.29 | 0.28 | 0.28 |
| Opening property | ◯ | ◯ | ◯ | ◯ | ◯ | ◯ | ◯ |

As shown in Table 4, in Test Nos. 12 to 16 wherein the weight proportions of the conjugated diene-type hydrocarbon blocks are from 8 to 40 parts, the tensile modulus of elasticity satisfies the requirement for at least 150 kgf/mm², the running properties by an automatic covering machine are excellent, and no drop impact rupture was observed. Further, the dynamic friction coefficient is not higher than 0.4, and the opening properties are excellent. On the other hand, in Test No. 11 wherein the weight proportion of the conjugated diene-type hydrocarbon blocks was 3 parts, the tube was inferior in the drop impact rupture, and in Test No. 17 wherein the weight proportion of the conjugated diene-type hydrocarbon blocks was 45 parts, the tensile modulus of elasticity is smaller than 150 kgf/mm², and the product is

TABLE 5

| | | No. | | | | | |
|---|---|---|---|---|---|---|---|
| | | 18 | 19 | 20 | 21 | 22 | 23 |
| Amount of lubricant (parts) | | 1.0 | 1.0 | 1.0 | 1.0 | 1.0 | 0 |
| Stretching ratio | LD | 1.2 | 1.5 | 1.7 | 1.2 | 2.0 | 1.5 |
| | RD | 1.8 | 2.2 | 1.7 | 1.4 | 2.2 | 1.8 |
| Heat shrinkage | LD | 15 | 35 | 40 | 15 | 50 | 35 |
| | RD | 45 | 55 | 40 | 30 | 55 | 45 |
| Finishing | | ◯ | ◯ | ◯~△ | X | X | ◯ |
| Dynamic friction coefficient | | 0.29 | 0.31 | 0.32 | 0.28 | 0.27 | 0.65 |

TABLE 5-continued

| | No. | | | | | |
|---|---|---|---|---|---|---|
| | 18 | 19 | 20 | 21 | 22 | 23 |
| Opening property | ○ | ○ | ○ | ○ | ○ | x |

LD: Longitudinal direction
RD: Radial direction

As is evident from Table 5, in Test Nos. 18 to 20 wherein the shrinkage is at most 40% in the longitudinal direction and at least 40% in the radial direction, and the dynamic friction coefficient is at most 0.4, the finishing and the opening properties are excellent. Whereas, in Test No. 21 wherein the shrinkage in the radial direction is less than 40% and in Test No. 22 wherein the shrinkage in the longitudinal direction exceeds 40%, the finishing was poor, and the tubes thereby obtained were not suitable for use as tubes for covering dry cells. Further, in Test No. 23 wherein the dynamic friction coefficient exceeds 0.4, the opening property was poor.

EXAMPLE 4

20 Parts by weight of a block copolymer made of 40 wt % of styrene and 60 wt % of butadiene (manufactured by Asahi Chemical Industry Co., Ltd.), 75 parts by weight of a random copolymer made of 90 wt % of styrene and 10 wt % of butyl acrylate (manufactured by Asahi Chemical Industry Co., Ltd.) and 5 parts by weight of a high-impact polystyrene (manufactured by Asahi Chemical Industry Co., Ltd.) were melt-mixed by means of a same directional twin screw extruder to obtain pellets of the composition. The above composition was subjected to tubular extrusion to obtain a non-stretched tube having an outer diameter of 8.0 mm and a thickness of 0.20 mm. This tube was subjected to tubular stretching at a stretching temperature of 98° C. at a stretching ratio of 1.2 times in the longitudinal direction and 2.5 times in the radial direction, to obtain a stretched tube. In the same manner, tests were carried out with the weight proportions as identified in Table 6, and the results were compared.

TABLE 6

| | Test No. | | | |
|---|---|---|---|---|
| | 31 | 32 | 33 | 34 |
| Block copolymer | 20 | 20 | 10 | 4 |
| Random copolymer | 80 | 75 | — | — |
| HIPS | — | 5 | 90 | 96 |
| Shrinkage in the longitudinal direction (%) | 20 | 20 | 18 | 21 |
| Shrinkage in the radial direction (%) | 50 | 52 | 52 | 54 |
| Continuous productivity | X~Δ | ○ | ○ | ○ |
| Surface roughness (μm) | 0.9 | 1.8 | 3.8 | 4.1 |
| Dynamic friction coefficient | 0.52 | 0.38 | 0.25 | 0.24 |
| Drop impact rupture | ○ | ○ | ○ | Δ |
| Parts by weight of conjugated diene-type hydrocarbon blocks | 12 | 12 | 6 | 2.4 |

As shown in Table 6, in Test Nos. 32 and 33 wherein the weight ratio of HIPS is within a range of from 5 to 90 wt %, continuous production under a stabilized condition was possible, and the dynamic friction coefficients were not more than 0.4 due to an increase of the surface roughness of the tube.

On the other hand, in Test No. 31 wherein no HIPS was incorporated, no stabilized continuous productivity was obtained due to punctures by longitudinal rupture along the fold lines of the tube, and no adequate surface roughness of the tube was obtained, whereby the dynamic friction coefficient exceeded 0.4, and thus the product was inferior to those obtained in Test Nos. 32 and 33.

In Test No. 34, wherein the amount of HIPS was 96 wt %, the continuous productivity and the dynamic friction coefficient were good, but the weight ratio of conjugated diene-type hydrocarbon blocks was less than 5%, whereby the impact resistance was slightly poor.

EXAMPLE 5

A stretched tube was prepared in the same manner as in Example 4 from a mixture comprising 40 parts by weight of a block copolymer made of 70 wt % of styrene and 30 wt % of butadiene (manufactured by Asahi Chemical Industry Co., Ltd.), 55 parts by weight of a random copolymer made of 90 wt % of styrene and 10 wt % of butyl acrylate (manufactured by Asahi Chemical Industry Co., Ltd.), 5 parts by weight of a high-impact polystyrene (manufactured by Asahi Chemical Industry Co., Ltd.) and 0.5 part by weight of an inorganic lubricant (magnesium silicate) or an organic lubricant (erucic amide) as inert fine particles. Further, in the same manner, tests were carried out with the weight proportions as identified in Table 7, and the results were compared.

TABLE 7

| | Test No. | | | | | |
|---|---|---|---|---|---|---|
| | 35 | 36 | 37 | 38 | 39 | 40 |
| Block copolymer | 40 | 40 | 40 | 40 | 40 | 40 |
| Random copolymer | 55 | 55 | 55 | 55 | 55 | 60 |
| HIPS | 5 | 5 | 5 | 5 | 5 | |
| Mg silicate | 0.5 | | | 0.5 | 0.5 | |
| Erucic amide | | 0.5 | | | | |
| Continuous productivity | ○ | ○ | ○ | ○ | ○ | X~Δ |
| Shrinkage in the longitudinal direction | 15 | 16 | 15 | 16 | 42 | 15 |
| Shrinkage in the radial direction | 52 | 51 | 52 | 38 | 51 | 52 |
| Dynamic friction coefficient | 0.35 | 0.32 | 0.44 | 0.38 | 0.32 | 0.54 |
| Finishing | ○ | ○ | ○ | X | X | ○ |
| Opening property | ○ | ○ | Δ | ○ | ○ | X |

As shown in Table 7, in Test Nos. 35 and 36 which satisfy the requirements such that the shrinkage is at most 40% in the longitudinal direction and at least 40% in the radial direction, and the dynamic friction coefficient is at most 0.4, the finishing and the opening properties were both excellent. Whereas, in Test No. 37 wherein the dynamic friction coefficient exceeds 0.4, the opening property was poor. In Test No. 38 wherein the shrinkage in the radial direction was less than 40% and in Test No. 39 wherein the shrinkage in the longitudinal direction exceeded 40%, the finishing was poor, and the tubes thereby obtained were not useful as tubes for covering dry cells. Further, in Test No. 40 wherein no HIPS was incorporated, the continuous productivity and the opening property were poor.

EXAMPLE 6

A stretched tube was prepared in the same manner as in Example 4 from a mixture comprising 8 parts by weight of a block copolymer made of 30 wt % of styrene and 70 wt % of butadiene (manufactured by Asahi Chemical Industry Co., Ltd.), 82 parts by weight of common polystyrene (manufactured by Mitsubishi Kasei Corporation) and 10 parts by weight of a high-impact polystyrene (manufactured by Asahi Chemical Industry Co., Ltd.). Further, in the same manner, tests were carried out with the weight proportions as identified in Table 8, and the results were compared.

TABLE 8

|  | Test No. | | | |
| --- | --- | --- | --- | --- |
|  | 41 | 42 | 43 | 44 |
| Block copolymer | 5 | 8 | 56 | 70 |
| Common polystyrene | 85 | 82 | 34 | 20 |
| HIPS | 10 | 10 | 10 | 10 |
| Tensile modulus of elasticity | 294 | 280 | 161 | 148 |
| Running property by an automatic machine | O | O | O | Δ |
| Drop impact rupture | Δ | O | O | O |
| Parts by weight of conjugated diene-type hydrocarbon blocks | 4 | 6 | 39 | 49 |

As shown in Table 8, in Test Nos. 42 and 43 wherein the weight proportions of the conjugated diene-type hydrocarbon blocks were from 5 to 40 parts, the tensile modulus of elasticity of at least 150 kgf/mm$^2$ was satisfied, the running property by an automatic covering machine was excellent, and no drop impact rupture was observed.

Whereas, in Test No. 41 wherein the weight proportion of the conjugated diene-type hydrocarbon blocks was 4 parts, the product was poor in the drop impact rupture property, although the tensile modulus of elasticity of at least 150 kgf/mm$^2$ was satisfied, and the running property by an automatic covering machine was excellent. Further, in Test No. 44 wherein the weight proportion of the conjugated diene-type hydrocarbon blocks was 49 parts, the tensile modulus of elasticity was less than 150 kg/mm$^2$, the running property by an automatic covering machine was poor, and the product was inferior to those obtained in Test Nos. 42 and 43 for covering dry cells, although the product was excellent in the drop impact rupture property.

As described in the foregoing, according to the present invention, a tube is made of a composition comprising, as main components, a block copolymer having styrene-type hydrocarbon blocks and conjugated diene-type hydrocarbon blocks, and a polymer containing a styrene-type hydrocarbon, wherein the conjugated diene-type blocks in the block copolymer constitute from 5 to 40 wt % of the entire composition, whereby it is possible to obtain a tube which has high nerviness and is excellent in impact resistance and free from whitening on bending and which provides excellent covering processability. Further, by using a random copolymer having a glass transition temperature of from 40° to 90° C. as the polymer containing a styrene-type hydrocarbon, it is possible to obtain a tube which has both excellent low temperature shrinkability and small natural shrinkability. Furthermore, when HIPS is employed as the polymer containing a styrene-type hydrocarbon, it is possible to obtain a tube which provides constant stretching productivity and which is excellent in the opening property and has a good inner surface slip-property to facilitate insertion of dry cells by means of an automatic covering apparatus for dry cells.

What is claimed is:

1. A heat-shrinkable polystyrene tube made of a composition comprising, as main components, an unhydrogenated block copolymer consisting essentially of styrene, o-, p- or α-methyl styrene hydrocarbon blocks and a conjugated diene selected from the group consisting of butadiene, isoprene and 1,3-pentadiene hydrocarbon blocks, and a polymer containing a styrene hydrocarbon, wherein the conjugated diene blocks in the block copolymer constitute from 5 to 40 wt % of the entire composition and from 60 to 80% of the block copolymer and the polymer containing a styrene hydrocarbon is a random copolymer having a glass transition temperature of from 40° to 90° C., a high-impact polystyrene having conjugated diene hydrocarbon polymer particles dispersed therein or mixtures thereof.

2. The heat-shrinkable polystyrene tube according to claim 1, wherein the conjugated diene hydrocarbon blocks in the block copolymer constitute from 8 to 25 wt % of the entire composition.

3. The heat-shrinkable polystyrene tube according to claim 1, wherein the polymer containing a styrene hydrocarbon is a random copolymer having a glass transition temperature of from 40° to 90° C.

4. The heat-shrinkable polystyrene tube according to claim 1, wherein the polymer containing a styrene hydrocarbon is a high-impact polystyrene having conjugated diene hydrocarbon polymer particles dispersed therein.

5. The heat-shrinkable polystyrene tube according to claim 4, wherein the amount of the high-impact polystyrene is from 1 to 95 wt %, based on the total amount of the block copolymer and the high-impact polystyrene.

6. The heat-shrinkable polystyrene tube according to claim 1, wherein a random copolymer having a glass transition temperature of from 40 to 90° C. and a high-impact polystyrene having conjugated diene hydrocarbon polymer particles dispersed therein are used in combination as the polymer containing a styrene hydrocarbon.

7. The heat-shrinkable polystyrene tube according to claim 6, wherein the amount of the high-impact polystyrene is from 1 to 95 wt %, based on the total amount of the block copolymer, the random copolymer and the high-impact polystyrene.

8. The heat-shrinkable polystyrene tube according to claim 1, which has a shrinkage of at most 40% in the longitudinal direction and at least 40% in the radial direction, when immersed in hot water of 100° C. for 10 seconds, a tensile modulus of elasticity in the longitudinal direction of at least 150 kgf/mm$^2$ and an inner surface dynamic friction coefficient of at most 0.4.

9. The heat-shrinkable polystyrene tube according to claim 8, wherein the shrinkage is at most 30% in the longitudinal direction and at least 45% in the radial direction, when immersed in hot water of 100° C. for 10 seconds.

10. The heat-shrinkable polystyrene tube according to claim 1, wherein the block copolymer consists essentially of butadiene and styrene blocks.

11. The heat shrinkable polystyrene tube according to claim 1, wherein the block copolymer consists of butadiene and styrene blocks.

* * * * *